Figure 1:
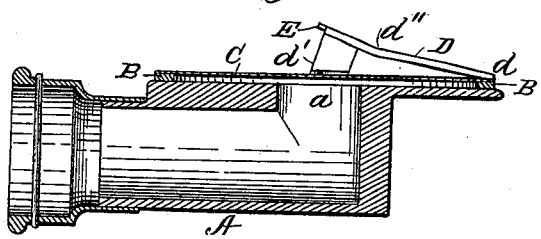

No. 683,958. Patented Oct. 8, 1901.
T. H. MACDONALD.
SOUND RECORD.
(Application filed Aug. 23, 1898.)

(No Model.)

Witnesses
W. R. Edelen.

Inventor
Thomas H. Macdonald
by his attorneys.

THE NORRIS PETERS CO., PHOTO-LITHO., WASHINGTON, D. C.

UNITED STATES PATENT OFFICE.

THOMAS H. MACDONALD, OF BRIDGEPORT, CONNECTICUT, ASSIGNOR TO THE AMERICAN GRAPHOPHONE COMPANY, OF WEST VIRGINIA.

SOUND-RECORD.

SPECIFICATION forming part of Letters Patent No. 683,958, dated October 8, 1901.

Application filed August 23, 1898. Serial No. 689,352. (No model.)

*To all whom it may concern:*

Be it known that I, THOMAS H. MACDONALD, of Bridgeport, Connecticut, have invented a new and useful Improvement in Sound-Recorders, which improvement is fully set forth in the following specification.

My invention relates to improvements in graphophones or phonographs, and more particularly to the recorder of the type shown in United States Letters Patent No. 527,755, granted to me October 16, 1894. Its object is to provide a recorder that is simpler in form, cheaper in construction, and that produces better results than heretofore attained.

In the recorder now in use the diaphragm is held between the main body or "head" of the recorder and an annulus screwed into it, there being gaskets on each side of the diaphragm. An objection to this construction is that if there be any irregularity in the screw-threads or if the diaphragm be not of exactly the same thickness at every part of its margin or if there be any irregularity in the adjacent faces of the head and the annulus there will be an unequally-distributed strain or tension on the diaphragm. The results of this unequal distribution of strain are that the diaphragm (usually of glass) is more liable to break and the vibrations transmitted to the stylus do not correspond with entire accuracy to the sound impulses impinging upon the diaphragm, because the strain on the diaphragm interferes with its freedom of movement, and particularly when the diaphragm is held tighter at one portion of its circumference than at another the vibrations are distorted and nodes are produced. One object of my present invention is to avoid this objection by doing away with this strain, which purpose I accomplish by discarding the annulus referred to and securing the diaphragm directly to a gasket, preferably of rubber, that is itself secured to the flat surface of the head, in a manner hereinafter to be described. This construction, involving, as it does, fewer parts, renders the recorder simpler and lighter, besides overcoming the objections already noted. Again, in the recorder now in use the point of the stylus is held by a clamp, which is fastened only to the center of the diaphragm; but necessarily the wings or flanges of the said clamp that are cemented to the diaphragm spread out, so that they cover a comparatively large portion of its surface. The stylus in such a construction may be regarded as a projection, stud, or post rising from the center of the diaphragm, but with the disadvantage of an extended base, which interferes with the buckling of the diaphragm, and besides acts as a damper, deadening the sound more or less. My present invention is an improvement over this old construction in two respects—first, in providing a stylus in the form of a lever, one end attached to the margin of the diaphragm (where the latter is substantially rigid) and the other end attached to the center of the diaphragm, (where it has the maximum mobility,) which allows a greater range of travel to the stylus-point, and, second, in making the wings or flanges of the clamp smaller, so that this point of attachment approximates more nearly a geometrical point, not interfering so much with the freedom and accuracy of vibration of the diaphragm and not dampening the sounds.

Figure 2:
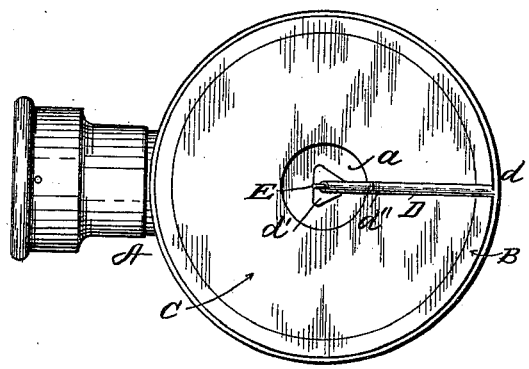
Figure 3:
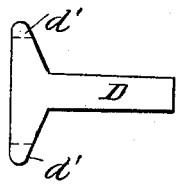

In the accompanying drawings, Figure 1 is a longitudinal vertical section, and Fig. 2 a plan view, of my new recorder inverted. Fig. 3 is a detail showing the blank used to form the clamp that holds the stylus-point.

The main portion or head A of the recorder is of the same general form as seen in my Patent No. 527,755, having the passage-way $a$ from the center of the flat surface of the head through the rear end thereof.

B indicates a ring, of yielding material, preferably of rubber.

C is the diaphragm.

D is the arm or lever, carrying the cutting-point E and attached at one end to the margin of the diaphragm at $d$ and at the other end to the center of the diaphragm, opposite to the entrance of passage-way $a$, at $d'$ $d'$.

The ring B is covered with cement (stratena) and then attached to the margin of the flat surface of the head, after which the diaphragm is placed lightly upon the ring and allowed to settle down into place by its own weight. This entirely prevents any strain or twisting whatever.

The blank shown in Fig. 3 is formed into a tube and clamped firmly around the cutting-point at the end containing the flanges. The flanges are bent down and their extremities bent outward to form feet $d'\,d'$. The arm D thus formed is bent downward slightly at $d''$, so as to present the stylus to the blank-cylinder at the proper angle, and finally the arm D is cemented to the diaphragm at $d'\,d'$, as described. Inasmuch as the arm D is attached to the diaphragm at both ends, the feet $d'\,d'$ may be far smaller than if they were the only means of attachment. This presents the twofold advantage of not interfering with the buckling action of the diaphragm when in vibration and of not acting as a damper.

The advantages of my present invention are that the diaphragm has fuller and freer vibrations and is not liable to break; that the cutting-point has a greater range of vibration, more nearly at right angles to the diaphragm and more nearly normal to the surface of the blank-cylinder; that it cuts a deeper record; that the recorder as a whole, besides being simpler and cheaper, is far lighter, which in this art is recognized as a great desideratum, and that the record engraved in the tablet corresponds more nearly than heretofore to the actual form of the sound-waves.

The reproduction of a sound-record made by my new recorder is clearer, louder, and more accurate than was heretofore attainable.

Having thus described my invention, I claim as new and desire to secure by Letters Patent—

1. In a sound-recorder, a head or support having a flat face, a sound-duct leading therefrom, a diaphragm cemented at its margin to said face opposite said duct, and a recording device carried by said diaphragm upon its outer face, substantially as described.

2. In a sound-recorder, the head or support, and the diaphragm therefor, the latter attached all around its margin directly to the flat face of said head by a continuous yielding support, substantially as described.

3. In a sound-recorder, a head or support inclosing a tubular passage terminating in a chamber, and a diaphragm attached to said head by a yielding medium to completely inclose said chamber, substantially as described.

4. In a sound-recorder a head or support, a diaphragm, and a ring of yielding material interposed between the face of the head or support and the diaphragm and cemented to both, substantially as described.

5. In a sound-recorder a head or support, a diaphragm, and a rubber ring interposed between the face of the head or support and the diaphragm and cemented to both, substantially as described.

6. In a sound-recorder a cutting-point mounted in a lever which is attached to the diaphragm substantially at its center and at its circumference, substantially as described.

7. In a sound-recorder a bent or elbow lever having one end secured to the diaphragm near its center and the other end secured near its margin, and the cutting-point held at the bend or elbow, substantially as described.

8. In a sound-recorder, a diaphragm, and a stylus supported solely thereby upon one side thereof, in combination with a head or support to which said diaphragm (with its said stylus) is secured solely at its opposite side, substantially as described.

9. A sound-recorder comprising a head or support, a diaphragm secured by an elastic medium at the edge of one of its sides to said head or support but unattached on its opposite side, and a recording-stylus attached to said opposite side of the diaphragm, substantially as described.

10. A sound-recorder comprising a head or support, a diaphragm carrying a stylus and a ring of yielding material cemented on one side to said head and on the other to the edge of said diaphragm, substantially as described.

In testimony whereof I have signed this specification in the presence of two subscribing witnesses.

THOMAS H. MACDONALD.

Witnesses:
 HENRY A. HUBBELL,
 E. M. SCILLNER.

Correction in Letters Patent No. 683,958.

It is hereby certified that in Letters Patent No. 683,958, granted October 8, 1901, upon the application of Thomas H. Macdonald, of Bridgeport, Connecticut, in the grant and headings of the printed specification and drawings the title of the invention was erroneously written and printed "Sound-Records," whereas the said title should have been written and printed *Sound-Recorders;* and that the said Letters Patent should be read with this correction therein that the same may conform to the record of the case in the Patent Office.

Signed, countersigned, and sealed this 22d day of October, A. D., 1901.

[SEAL.]
                F. L. CAMPBELL,
                *Assistant Secretary of the Interior.*

Countersigned:
 F. I. ALLEN,
  *Commissioner of Patents.*